(12) United States Patent
Owaki

(10) Patent No.: US 12,143,699 B2
(45) Date of Patent: Nov. 12, 2024

(54) SENSOR MODULE AND METHOD FOR PRODUCING SENSOR MODULE BY LASER WELDING

(71) Applicant: Sony Semiconductor Solutions Corporation, Kanagawa (JP)

(72) Inventor: Hirofumi Owaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 58 days.

(21) Appl. No.: 17/798,053

(22) PCT Filed: Feb. 10, 2021

(86) PCT No.: PCT/JP2021/004946
§ 371 (c)(1),
(2) Date: Aug. 5, 2022

(87) PCT Pub. No.: WO2021/166761
PCT Pub. Date: Aug. 26, 2021

(65) Prior Publication Data
US 2023/0116237 A1  Apr. 13, 2023

(30) Foreign Application Priority Data
Feb. 17, 2020 (JP) ................................ 2020-024244

(51) Int. Cl.
*H04N 23/51* (2023.01)
*G01S 7/481* (2006.01)

(52) U.S. Cl.
CPC .......... *H04N 23/51* (2023.01); *G01S 7/4813* (2013.01)

(58) Field of Classification Search
CPC ...... H04N 23/51; H04N 23/54; G01S 7/4813; G01S 7/481; G03B 17/12; G01D 11/30; G01D 11/245
See application file for complete search history.

(56) References Cited

U.S. PATENT DOCUMENTS 9,674,410 B2 *  6/2017  Uchiyama .............. H04N 23/57
2006/0171704 A1  8/2006  Bingle
(Continued)

FOREIGN PATENT DOCUMENTS

CN  109474778 A   3/2019
EP  2 671 705 A1  12/2013
(Continued)

OTHER PUBLICATIONS

PCT/JP2021/004946, Apr. 13, 2021, International Search Report.
(Continued)

*Primary Examiner* — Padma Haliyur
(74) *Attorney, Agent, or Firm* — Wolf, Greenfield & Sacks, P.C.

(57) ABSTRACT

A sensor module according to an embodiment of the present technology includes a sensor element, a first casing, a bracket, and a second casing. The first casing includes an opening end and accommodates therein the sensor element. The bracket fixes the first casing to an attachment target. The second casing includes a first surface that includes a first welding portion welded to the opening end, and a second surface that includes a second welding portion welded to the bracket, the second casing being fixed between the first casing and the bracket.

9 Claims, 9 Drawing Sheets

(56) References Cited

U.S. PATENT DOCUMENTS

| | | | |
|---|---|---|---|
| 2008/0253000 A1 | 10/2008 | Matsunaga et al. | |
| 2014/0132768 A1 | 5/2014 | Choi | |
| 2014/0146214 A1* | 5/2014 | Nakajima | H04N 23/55 348/335 |
| 2015/0029337 A1* | 1/2015 | Uchiyama | H01R 4/06 348/148 |
| 2016/0250713 A1* | 9/2016 | Wang | H04N 23/51 348/373 |
| 2017/0339322 A1* | 11/2017 | Bauer | H04N 23/55 |
| 2018/0023982 A1 | 1/2018 | Henniger et al. | |
| 2018/0098033 A1* | 4/2018 | Mleczko | B60R 1/088 |
| 2019/0170544 A1* | 6/2019 | Higashimachi | B60R 11/04 |
| 2019/0174623 A1* | 6/2019 | Owaki | H04N 23/51 |
| 2019/0260918 A1* | 8/2019 | Kim | H04N 23/51 |
| 2020/0059583 A1* | 2/2020 | Tamura | H04N 23/54 |
| 2021/0094474 A1* | 4/2021 | Vetter | B60S 1/528 |
| 2022/0219622 A1* | 7/2022 | Byrne | H01R 12/7076 |
| 2022/0342279 A1* | 10/2022 | Bruneton | G03B 17/55 |

FOREIGN PATENT DOCUMENTS

| | | | | |
|---|---|---|---|---|
| EP | 3525444 A1 | 8/2019 | | |
| JP | H05-77684 A | 3/1993 | | |
| JP | 2008-262876 A | 10/2008 | | |
| JP | 2013-252667 A | 12/2013 | | |
| JP | 2017-519994 A | 7/2017 | | |
| JP | 2018-202976 A | 12/2018 | | |
| WO | WO-2018047491 A1 * | 3/2018 | | G03B 17/02 |

OTHER PUBLICATIONS

International Written Opinion and English translation thereof mailed Apr. 13, 2021 in connection with International Application No. PCT/JP2021/004946.

International Preliminary Report on Patentability and English translation thereof mailed Sep. 1, 2022 in connection with International Application No. PCT/JP2021/004946.

Extended European Search Report issued Jul. 20, 2023 in connection with European Application No. 21756209.9.

International Search Report and English translation thereof mailed Apr. 13, 2021 in connection with International Application No. PCT/JP2021/004946.

* cited by examiner (A)

(B)

(A)

(B)

SENSOR MODULE AND METHOD FOR PRODUCING SENSOR MODULE BY LASER WELDING

CROSS-REFERENCE TO RELATED APPLICATIONS

This application claims the benefit under 35 U.S.C. § 371 as a U.S. National Stage Entry of International Application No. PCT/JP2021/004946, filed in the Japanese Patent Office as a Receiving Office on Feb. 10, 2021, which claims priority to Japanese Patent Application Number JP2020-024244, filed in the Japanese Patent Office on Feb. 17, 2020, each of which is hereby incorporated by reference in its entirety.

TECHNICAL FIELD

The present technology relates to a sensor module mounted on, for example, a vehicle, and a method for producing the sensor module.

BACKGROUND ART

A conventional camera unit used by being mounted on a vehicle is fastened by screwing to be fixed to a bracket attached to a vehicle body (for example, Patent Literature 1). Further, packing is put between the camera unit and the bracket in order to prevent water from entering a vehicle, depending on the model of vehicle or the model of camera unit.

CITATION LIST

Patent Literature

Patent Literature 1: Japanese Patent Application Laid-open No. 2018-202976

DISCLOSURE OF INVENTION

Technical Problem

In the case of the conventional camera unit described above, there is a need to provide a space for a screw hollow and to perform attachment with a screw for packing. It is desirable that no space for a screw hollow be provided to increase a degree of freedom in design, fastening with a screw for packing not be performed to facilitate the operation (to improve the productivity), and production costs be reduced.

In view of the circumstances described above, it is an object of the present technology to provide a sensor module and a method for producing the sensor module, the sensor module making it possible to improve a degree of freedom in design, to facilitate the operation, and to reduce costs by reducing the number of components.

Solution to Problem

In order to achieve the object described above, a sensor module according to an embodiment of the present technology includes a sensor element, a first casing, a bracket, and a second casing. The first casing includes an opening end and accommodates therein the sensor element. The bracket fixes the first casing to an attachment target. The second casing includes a first surface that includes a first welding portion welded to the opening end, and a second surface that includes a second welding portion welded to the bracket, the second casing being fixed between the first casing and the bracket.

In the sensor module, the second casing is welded to the first casing and the bracket. This results in there being no need to provide a space for a screw hollow and to perform attachment with a screw for packing. This makes it possible to improve a degree of freedom in design, to facilitate the operation, and to reduce costs by reducing the number of components.

The first welding portion may be annularly provided along a portion, in a peripheral edge of the second casing, that is situated on the first surface, and the second welding portion may be annularly provided on a portion, in the peripheral edge, that is situated on the second surface on a side of an outer periphery of the first welding portion.

The second casing may further include a first convex surface portion that protrudes toward the bracket from the second surface to form the second welding portion.

The second casing may further include a plurality of second convex surface portions each provided on the second surface on a side of an inner periphery of the first convex surface portion, the plurality of second convex surface portions being capable of being brought into contact with the bracket.

The first convex surface portion may be annularly formed around the second surface. Alternatively, the first convex surface portion may be formed at a plurality of positions around the second surface.

The first casing and the bracket may be made of a resin material that has absorptive properties with respect to laser light of a specified wavelength, and the second casing may be made of a resin material that has transmissive properties with respect to the laser light.

The first casing and the bracket may be made of a resin material that has transmissive properties with respect to laser light of a specified wavelength, and the second casing may be made of a resin material that has absorptive properties with respect to the laser light.

The sensor element may be a solid-state imaging device.
The sensor element may be a ranging sensor.

A method for producing a sensor module according to an embodiment of the present technology includes accommodating a sensor element in a first casing; joining a first surface of a second casing to an opening end of the first casing using laser welding; and joining a bracket to a second surface of the second casing using the laser welding.

MODE(S) FOR CARRYING OUT THE INVENTION

Embodiments according to the present technology will now be described below with reference to the drawings.

[Configuration of Sensor Module]

Figure 1:
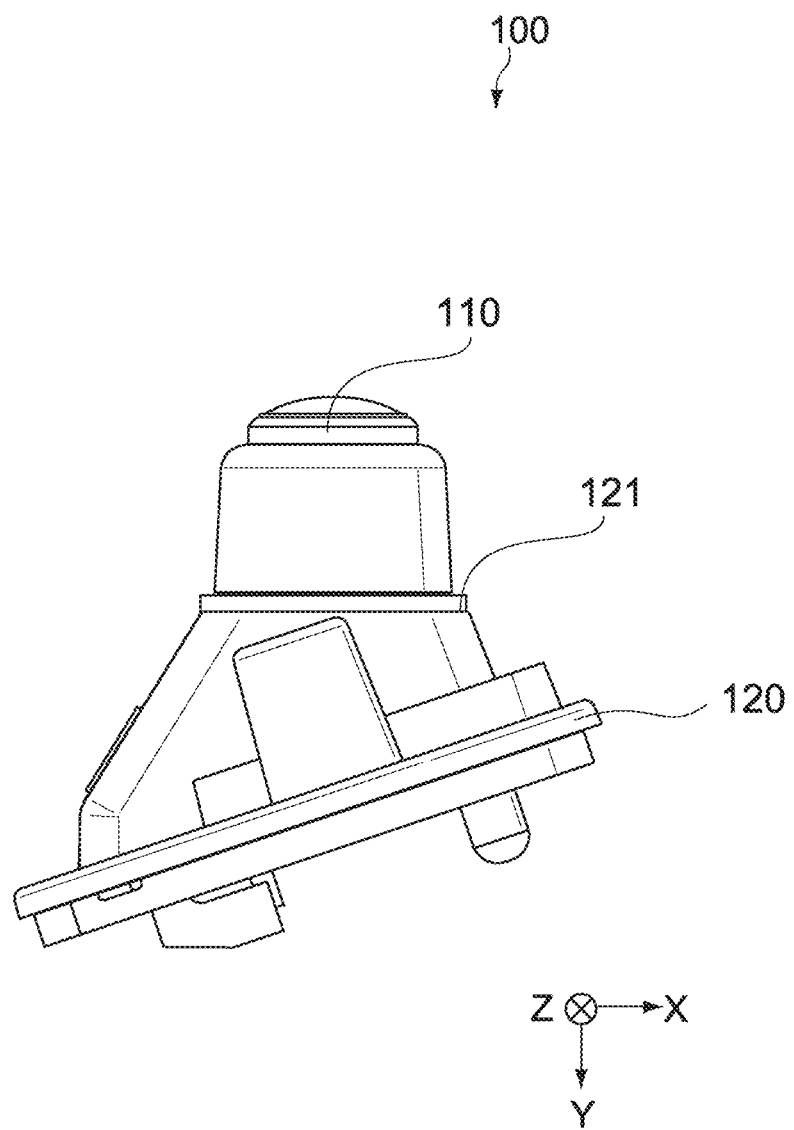
FIG. 1 is a side view of a sensor module according to an embodiment of the present technology.

FIG. 1 is a side view of a sensor module according to an embodiment of the present technology. A sensor module 100 of the present embodiment is a camera module used by being mounted on a vehicle.

In the following description, a right-and-left direction, a front-rear direction (an optical-axis direction), and a height direction of the sensor module 100 are respectively set to be a Z direction, a Y direction, and an X direction. Of course, such a setting of the direction is not limitative.

The sensor module 100 includes a camera unit 110 and a bracket 120. For example, the camera unit 110 is arranged outside of a vehicle body (an attachment target) (not illustrated), and internally includes an image-capturing component that captures an image of a region situated ahead of a vehicle, an image of a region situated behind the vehicle, or a region on a lateral side of the vehicle depending on an attachment position. For example, a camera attached to a front portion (for example, a radiator grill) of a vehicle body captures an image of an environment ahead of the vehicle. Further, the camera attached to a rear portion (for example, above a license plate) of the vehicle body captures an image of an environment behind the vehicle. Furthermore, the camera attached to a side portion of the vehicle (for example, an upper portion of a pillar (an A-pillar, a B-pillar, or a pillar (a C-pillar, a D-pillar) situated in the rear of the vehicle, or a sideview mirror) captures an image of an environment in a lateral direction of the vehicle.

The bracket 120 is a fixation member used to fix the camera unit 110 to a vehicle body. The bracket 120 includes a support surface 121 that supports the camera unit 110. As will be described later, the camera unit 110 is joined to the support surface 121 of the bracket 120 using laser welding.

Figure 2:
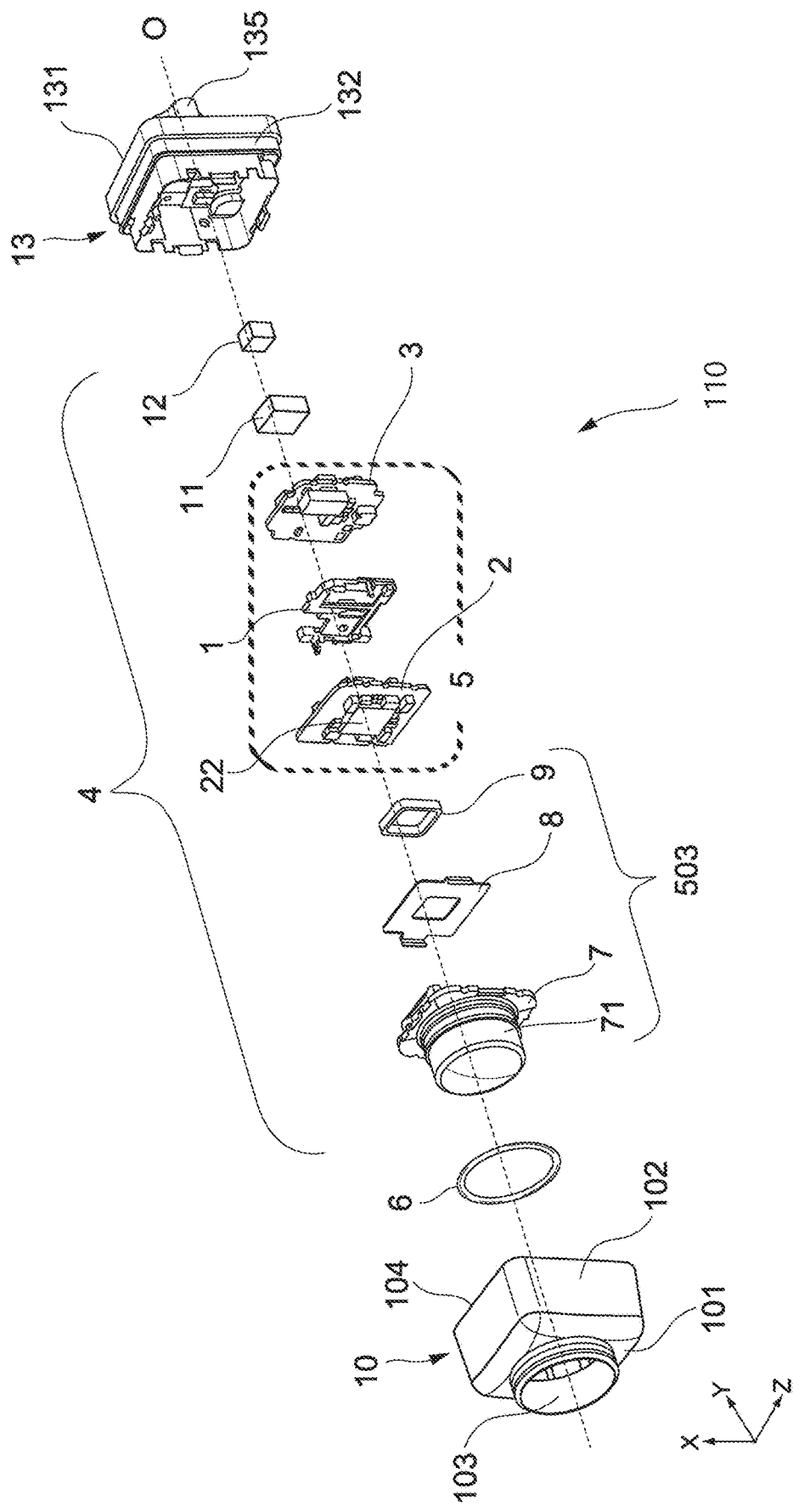
FIG. 2 is an exploded perspective view of a camera unit in the sensor module.
Figure 3:
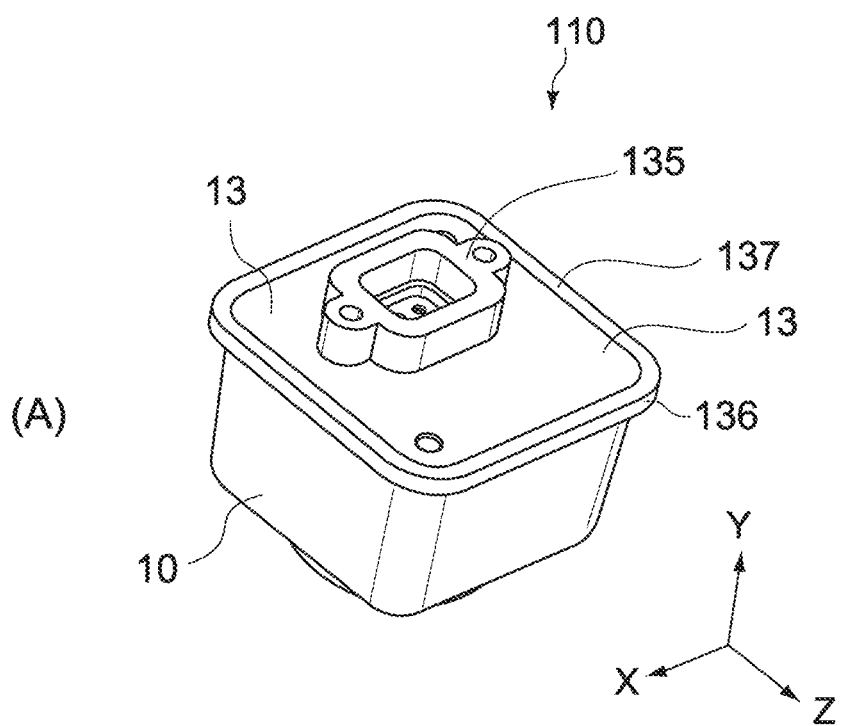
FIG. 3 is a set of overall perspective views of the camera unit.
Figure 3:
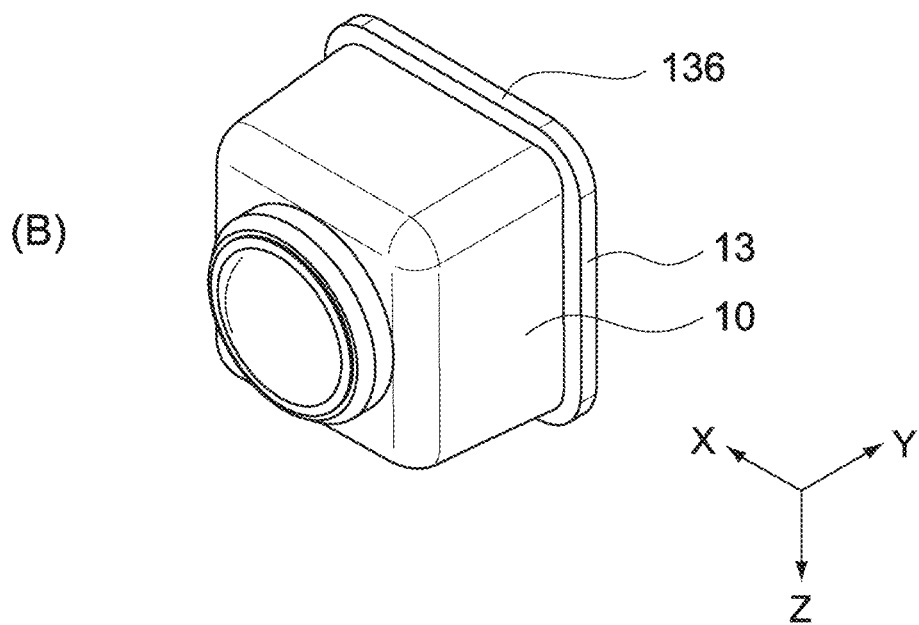
Figure 4:
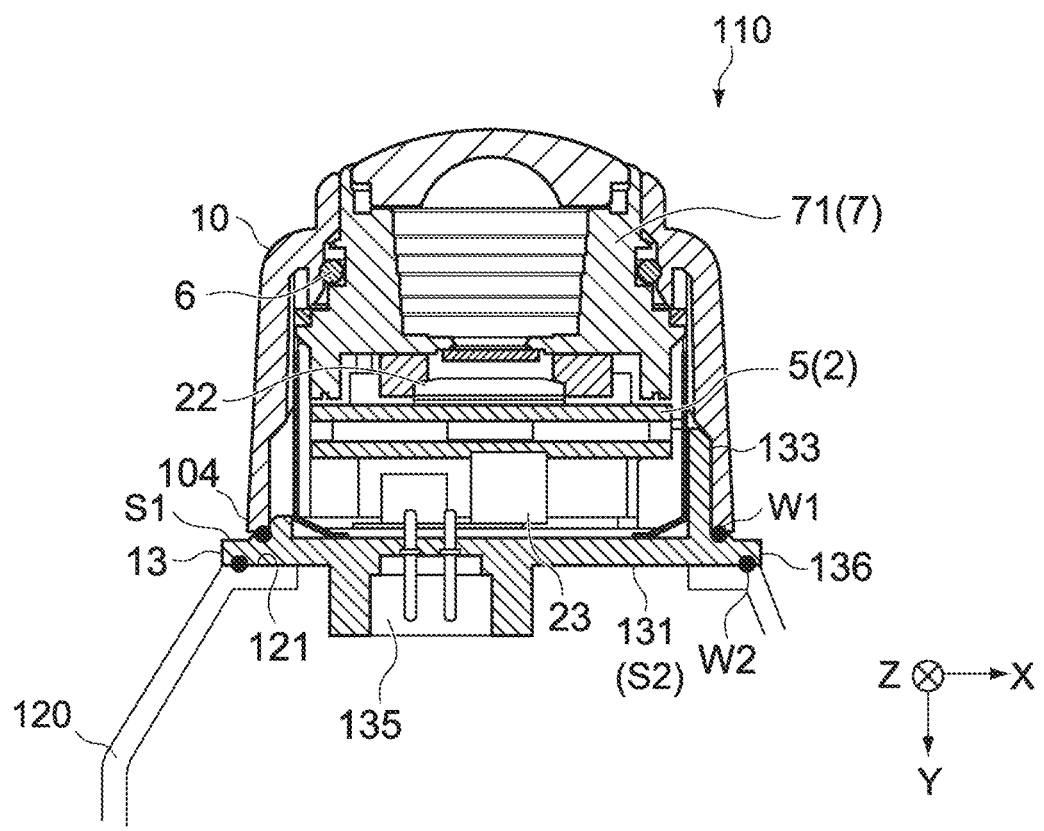
FIG. 4 is a cross-sectional side view of the camera unit.
Figure 5:
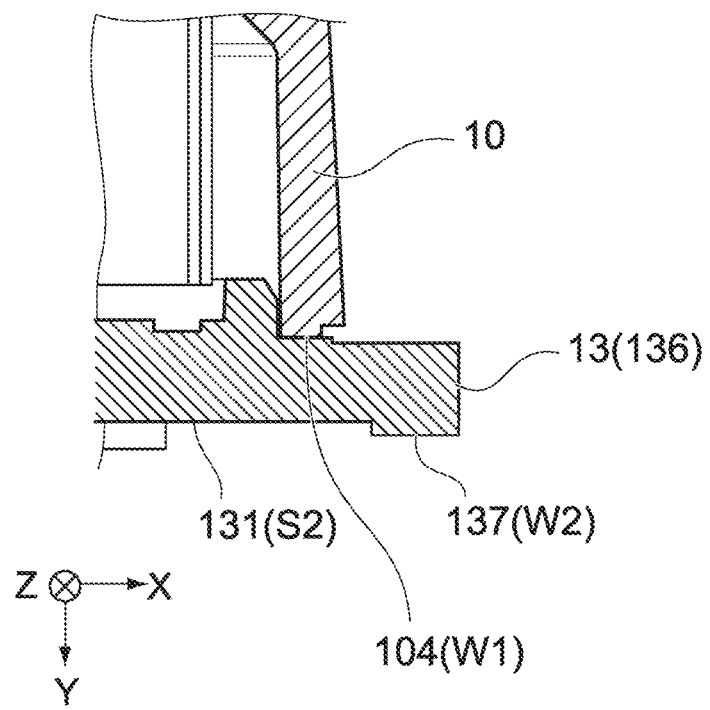
FIG. 5 is a cross-sectional view of a primary portion of the camera unit.

FIG. 2 is an exploded perspective view of the camera unit 110, (A) and (B) of FIG. 3 are overall perspective views of the camera unit 110, FIG. 4 is a cross-sectional side view of the camera unit 110, and FIG. 5 is a cross-sectional side view of a primary portion of the camera unit 110.

The camera unit 110 includes a front case (a first casing) 10, an O-ring 6, an image-capturing component 4, and a rear case 13 (a second casing) in this order in a positive Y-axis direction.

The image-capturing component 4 includes a lens assembly 7, a shield case 8 used for electromagnetic shielding, a dustproof sheet 9, a board unit 5, a heat dissipating sheet 11, and a spacer cushion 12 in this order in the positive Y-axis direction. The board unit 5 includes a front board 2, a spacer board 1, and a rear board 3 in this order in the positive Y-axis direction.

The front case 10 includes a front surface portion 101 that is formed substantially orthogonal to the front-rear direction (the Y direction), and a lateral surface portion 102 that extends toward the rear case 13 from a peripheral edge of the front surface portion 101. The front case 10 accommodates therein the image-capturing component 4.

In the present embodiment, the front surface portion 101 is substantially rectangular as viewed from the Y direction. The front case 10 is hollow, and includes a space portion that is a region surrounded by the front surface portion 101 and the lateral surface portion 102. At an end of the lateral surface portion 102 that is situated on the side of the rear case 13, the front case 10 includes a rectangular opening end 104 in a Z-X plane. The opening end 104 and the front surface portion 101 may be formed into any shape, such as a circle or a triangle, in the Z-X plane.

The rear case 13 is fixed between the front case 10 and the bracket 120. The rear case 13 is a shield case used for electromagnetic shielding, and includes a rear surface portion 131 that is arranged substantially orthogonal to the front-rear direction (the Y direction), and a lateral surface portion 132 that extends toward the front case 10 from a peripheral edge of the rear surface portion 131. The rear case 13 has a shape similar to a shape of the front surface portion 101, and, in the present embodiment, the rear surface portion 131 is substantially rectangular as viewed from the Y direction. A peripheral edge 136 of the rear case 13 is formed to have a larger area than the opening end 104 such that the peripheral edge 136 extends outward on the side of an outer periphery of the opening end 104 of the front case 10 (refer to (B) of FIG. 3). The rear case 13 is hollow, and includes a space portion that is a region surrounded by the rear surface portion 131 and the lateral surface portion 132.

The front case 10 and the rear case 13 are typically connected to each other using laser welding, which will be described in detail later. This results in forming an internal space that includes the space portion of the front case 10 and the space portion of the rear case 13. The image-capturing component 4 is arranged in the internal space.

As illustrated in FIG. 2, a through-hole 103 is formed in a middle portion of the front surface portion 101 of the front case 10, and a lens portion 71 of the lens assembly 7 is inserted into the through-hole 103 to assemble the lens assembly 7 to the front case 10. The image-capturing component 4 is arranged such that an optical axis O for image-capturing passes through substantially the center of the lens assembly 7.

The front board 2 and the rear board 3 are electrically connected to each other using a B-to-B connection (a connection using a connector) or a flexible connection. Upon making this connection, the spacer board 1 is arranged between the front board 2 and the rear board 3 by, for example, a snap-fit or bonding. A solid-state imaging device 22 such as a complementary metal-oxide semiconductor (CMOS) image sensor or a charge coupled device (CCD) image sensor is mounted on the front board 2 as a sensor element. The solid-state imaging device 22 captures an image of subject light through the lens assembly 7. Peripheral circuits such as a drive circuit that drives the solid-state imaging device 22, and a signal processing circuit that processes an output signal from the solid-state imaging device 22 are mounted on each of the front board 2 and the rear board 3.

A connector 135 is provided to the rear surface portion 131 of the rear case 13. For example, the connector 135 is electrically connected to the board unit 5 through a flexible printed circuit (FPC) 23. This results in supplying power from a vehicle body to the image-capturing component 4, or in outputting an image signal from the image-capturing component 4 to the vehicle body.

The O-ring 6 is arranged inside the front case 10 all around an inner peripheral surface of the front case 10. The O-ring 6 serves to form a seal between the front case 10 and the image-capturing component 4 (the lens assembly 7). This prevents, for example, raindrops from entering the casing through the through-hole 103 of the front case 10.

Any elastic material such as rubber or plastic may be used as a material of the O-ring 6.

In the present embodiment, the rear case 13 is joined to the front case 10 and the bracket 120 using laser welding. In order to weld the rear case 13 to the front case 10 and the bracket 120 using laser welding, the front case 10 and the bracket 120 are made of a resin material that has absorptive properties with respect to laser light of a specified wavelength. Further, the rear case 13 is made of a resin material that has transmissive properties with respect to the laser light.

For example, a general-purpose resin such as an acrylonitrile-styrene (AS) resin or an acrylonitrile-butadiene-styrene (ABS) resin, a polycarbonate (PC) resin, a mixture resin of ABS and PC, a polyamide (PA) resin, or a polybutylene terephthalate (PBT) resin is used as a resin material that has absorptive properties or transmissive properties with respect to laser light.

The absorptive properties or the transmissive properties with respect to laser light can be adjusted by, for example, an amount of a laser-absorptive material that is mixed with a resin. For example, carbon black can be used as the laser-absorptive material. The adjustment of an amount of the laser-absorptive material added makes it possible to adjust the laser-light absorptance (or the laser-light transmittance) discretionarily. Note that it is favorable that the same type of matrix resin be used for a resin material having absorptive properties with respect to laser light and a resin material having transmissive properties with respect to the laser light. This results in increasing an affinity between resins situated at a joining portion and in enhancing the weld strength. Further, a change in a thickness of a resin makes it possible to adjust the transmittance. When the thickness of a resin is made larger (when a resin is made thicker), this makes it possible to further decrease the transmittance of the resin. Further, when the thickness of a resin is made smaller (when a resin is made thinner), this makes it possible to further increase the transmittance of the resin.

In the present embodiment, for example, red laser light or infrared laser light of a wavelength of from 800 nm to 1100 nm is used as laser light used for welding. With respect to a resin material having transmissive properties with respect to laser light, the transmittance of the resin material with respect to the laser light is greater than or equal to 30%, and favorably greater than or equal to 40%.

As illustrated in FIG. 4, the rear case 13 includes a first surface S1 that faces the opening end 104 of the front case 10, and a second surface S2 that faces the support surface 121 of the bracket 120. The support surface 121 is formed into a rectangularly annular, planar shape that faces a portion, in the peripheral edge of the rear case 13, that corresponds to the second surface S2 (refer to FIG. 4).

The first surface S1 of the rear case 13 includes a protrusion 133 that is closely fitted into the opening end 104 of the front case 10. The first surface S1 further includes a first welding portion W1 that is welded to the opening end 104 of the front case 10. The first welding portion W1 is a melt-and-mixture portion of a resin material of the front case 10 and a resin material of the rear case 13 (indicated by a black circle on the first surface S1 in FIG. 4). The first welding portion W1 is annularly provided along the entirety of a portion, in the peripheral edge 136 of the rear case 13, that corresponds to the first surface S1 and faces the opening end 104.

The second surface S2 of the rear case 13 corresponds to the rear surface portion 131 of the rear case 13. The second surface S2 includes a second welding portion W2 that is welded to the support surface 121 of the bracket 120. The second welding portion W2 is a melt-and-mixture portion of a resin material of the bracket 120 and a resin material of the rear case 13 (indicated by a black circle on the second surface S2 in FIG. 4). As illustrated in (A) of FIG. 3 and FIG. 5, the second welding portion W2 is formed on a protrusion 137 (a first convex surface portion) that protrudes toward the support surface 121 of the bracket 120 from the second surface S2 of the rear case 13. The protrusion 137 is rectangularly annularly formed along the periphery (the peripheral edge 136) of the rear case 13, and a protrusion end surface of the protrusion 137 is a planar surface parallel to the support surface 121. The second welding portion W2 is annularly formed on the protrusion 137 by the protrusion 137 being welded to the support surface 121 using laser welding.

Figure 6:
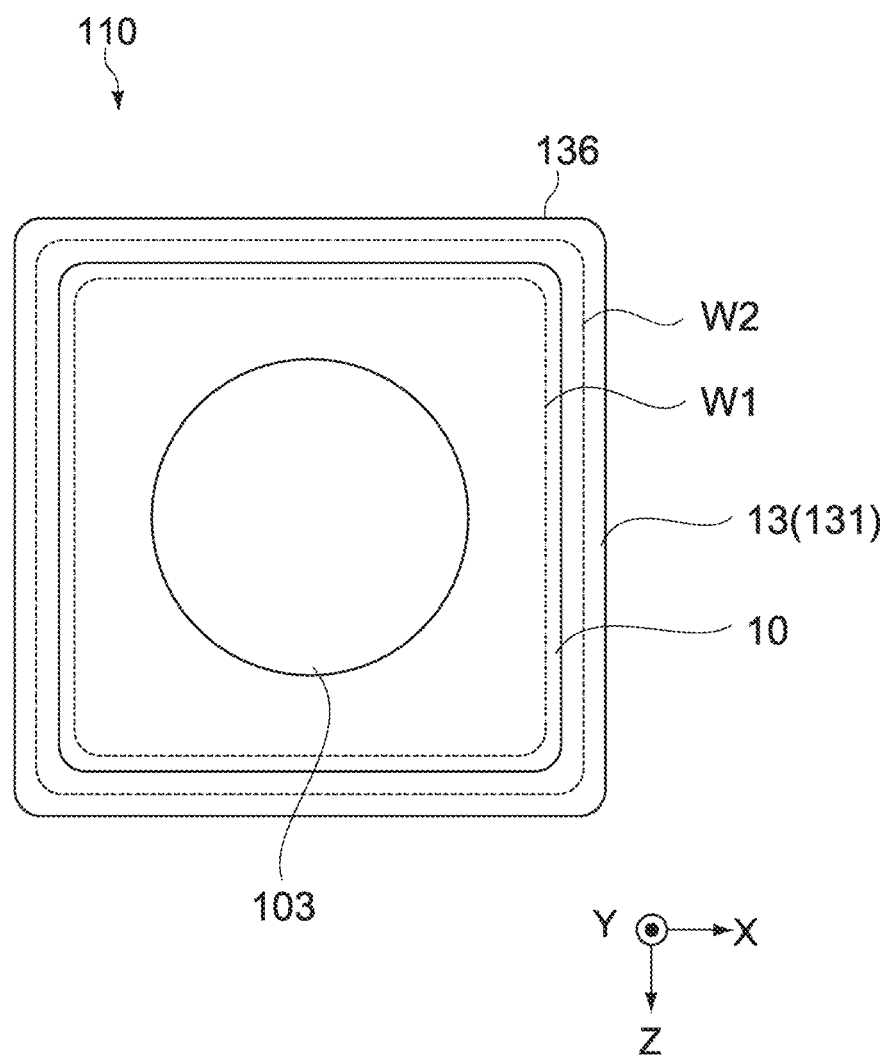
FIG. 6 is a schematic plan view of the camera unit that illustrates a relationship between a first welding portion and a second welding portion.

FIG. 6 is a schematic plan view of the camera unit 110 that illustrates a relationship between the first welding portion W1 and the second welding portion W2. In the Z-X plane, the first welding portion W1 and the second welding portion W2 are rectangularly annularly formed, with an optical axis of the camera unit 110 passing through the centers of the first welding portion W1 and the second welding portion W2, as illustrated in the figure. The first welding portion W1 and the second welding portion W2 are not formed in the same location as viewed from a direction of the optical axis, and the second welding portion W2 is formed on the side of an outer periphery of the first welding portion W1. Since the first welding portion W1 and the second welding portion W2 are each annually continuously formed, sealing properties of the joining portion between the front case 10 and the rear case 13 and of the joining portion between the rear case 13 and the bracket 120 are improved, and this results in ensuring waterproof properties and dustproof properties.

[Method for Producing Sensor Module]

Next, a method for producing the sensor module 100 having the configuration described above is described.

A method for producing a sensor module according to the present embodiment includes accommodating the camera unit 4 including a sensor element (the solid-state imaging device 22) in the front case 10, joining the first surface S1 of the rear case 13 to the opening end 104 of the front case 10 using laser welding, and joining the bracket 120 to the second surface S2 of the rear case 13 using laser welding.

Figure 7:
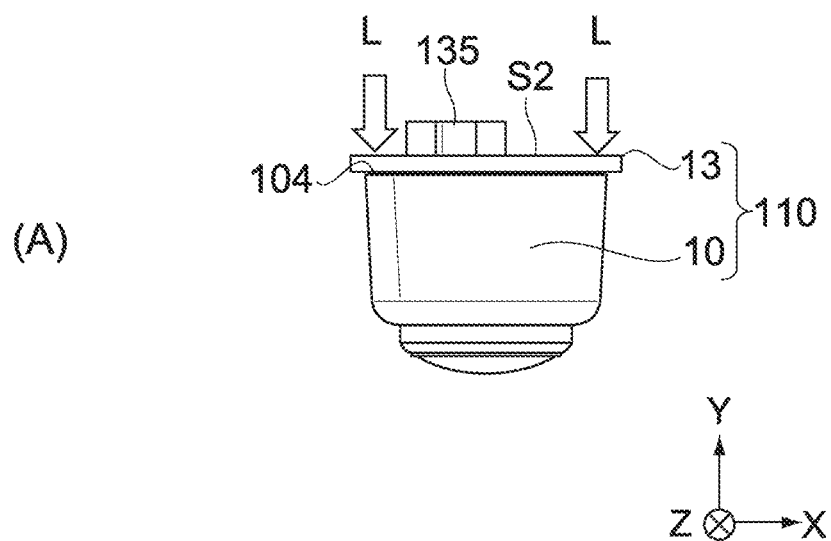
FIG. 7 is a set of schematic process diagrams used to describe a method for producing the sensor module.
Figure 7:
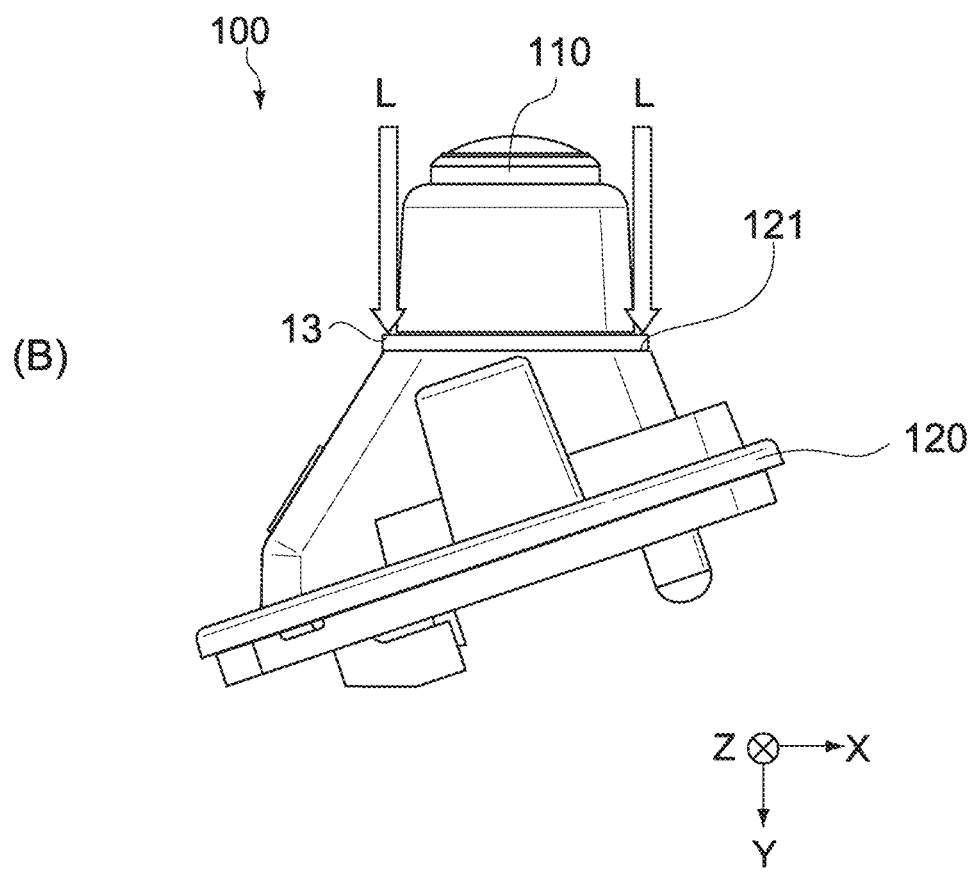

(A) and (B) of FIG. 7 are schematic process diagrams used to describe the method for producing the sensor module 100.

First, as illustrated in FIG. 2, the image-capturing component 4 obtained by sequentially assembling the shield case 8, the dustproof sheet 9, the board unit 5, the heat dissipating sheet 11, and the spacer cushion 12 to the lens assembly 7 in a Y-axis direction is accommodated in the front case 10 through the seal ring 6. Then, as illustrated in (A) of FIG. 7, the front case 10 and the rear case 13 are assembled to each other in the Y-axis direction such that the opening end 104 of the front case 10 and the first surface S1 of the rear case 13 face each other.

Thereafter, laser light L used for welding is irradiated onto the second surface S2 of the rear case 13 in a state in which the rear case 13 is pressed against the front case 10 under a specified load, as illustrated in (B) of FIG. 7. An irradiation direction is a direction of an arrow of the laser light L in (A) of FIG. 7. Here, the laser light L is transmitted through a resin layer of the rear case 13 to be irradiated onto a portion, in the front case 10, that corresponds to the opening end 104, and is rectangularly annularly scanned over the second surface S2 of the rear case 13 along the opening end 104. The laser light L may be pulsed light or continuous light.

In the present embodiment, the front case 10 is made of a resin material that has absorptive properties with respect to the laser light L, and the rear case 13 is made of a resin material that has transmissive properties with respect to the laser light L. Thus, the laser light L is transmitted through the rear case 13 to be irradiated onto the opening end 104 of the front case 10. A region, in the opening end 104, that is irradiated with the laser light L generates heat due to absorption of the laser light L to be partially melted. On the other hand, the first surface S1 being included in the rear case 13 and facing the opening end 104 is also partially melted due to heat transfer from a melted portion of the opening end 104. Thereafter, the melted portion of the front case 10 and a melted portion of the rear case 13 are cooled to be solidified, and the first welding portion W1 welded to the opening end 104 of the front case 10 is formed on the first surface S1 of the rear case 13. This results in producing the camera unit 110 obtained by the front case 10 and the rear case 13 being integrally joined to each other.

Next, as illustrated in (B) of FIG. 7, the camera unit 110 is turned upside down, and the camera unit 110 and the bracket 120 are assembled to each other in the Y-axis direction such that the second surface S2 of the rear case 13 faces the support surface 121 of the bracket 120. Thereafter, the laser light L used for welding is irradiated onto the first surface S1 of the rear case 13 of the camera unit 110 in a state in which the rear case 13 is pressed against the bracket 120 under a specified load. An irradiation direction is a direction of an arrow of the laser light L in (B) of FIG. 7. Here, the laser light L is transmitted through the resin layer of the rear case 13 to be irradiated onto a portion, in the rear case 13, that corresponds to the protrusion 137 (refer to (A) of FIG. 3 and FIG. 5), and is rectangularly annularly scanned over the first surface S1 of the rear case 13 along the protrusion 137. The laser light L may be pulsed light or continuous light.

In the present embodiment, the bracket 120 is made of a resin material that has absorptive properties with respect to the laser light L, as in the case of the front case 10. Thus, the laser light L is transmitted through the rear case 13 to be irradiated onto the support surface 121 of the bracket 120. A region, in the support surface 121, that is irradiated with the laser light L generates heat due to absorption of the laser light L to be partially melted. On the other hand, the protrusion 137 being included in the rear case 13 and facing the support surface 121 is also partially melted due to heat transfer from a melted portion of the support surface 121. Thereafter, the melted portion of the bracket 120 and a melted portion of the rear case 13 are cooled to be solidified, and the second welding portion W2 welded to the support surface 121 of the bracket 120 is formed on the second surface S2 of the rear case 13. This results in producing the sensor module 100 obtained by the camera unit 110 and the bracket 120 being integrally joined to each other.

As described above, the rear case 13 is welded to the front case 10 and the bracket 120 by laser welding. Thus, according to the present embodiment, there is no need to provide a space for a screw hollow and to perform attachment with a screw for packing, compared to when a rear case and a front case are joined to each other using a screw. This makes it possible to improve a degree of freedom in design, to facilitate the operation, and to reduce costs by reducing the number of screw components. Further, the sensor module 100 can be made smaller in size since there is no need for a space for a screw hollow. Furthermore, a high-functionality large component (LSI) can be implemented since the internal space of the sensor module 100 is made larger. This makes it possible to raise the functionality of the sensor module 100.

Further, according to the present embodiment, the rear case 13 is formed to have a larger area than the opening end 104 of the front case 10, and the second welding portion W2 is provided on the side of the outer periphery of the first welding portion W1. Consequently, even after the first welding portion W1 is formed (after the front case 10 and the rear case 13 are welded to each other), the laser light L can be irradiated onto the peripheral edge 136 that is included in the rear case 13 and on which the second welding portion W2 is formed. This results in being able to stably form the second welding portion W2.

Figure 8:
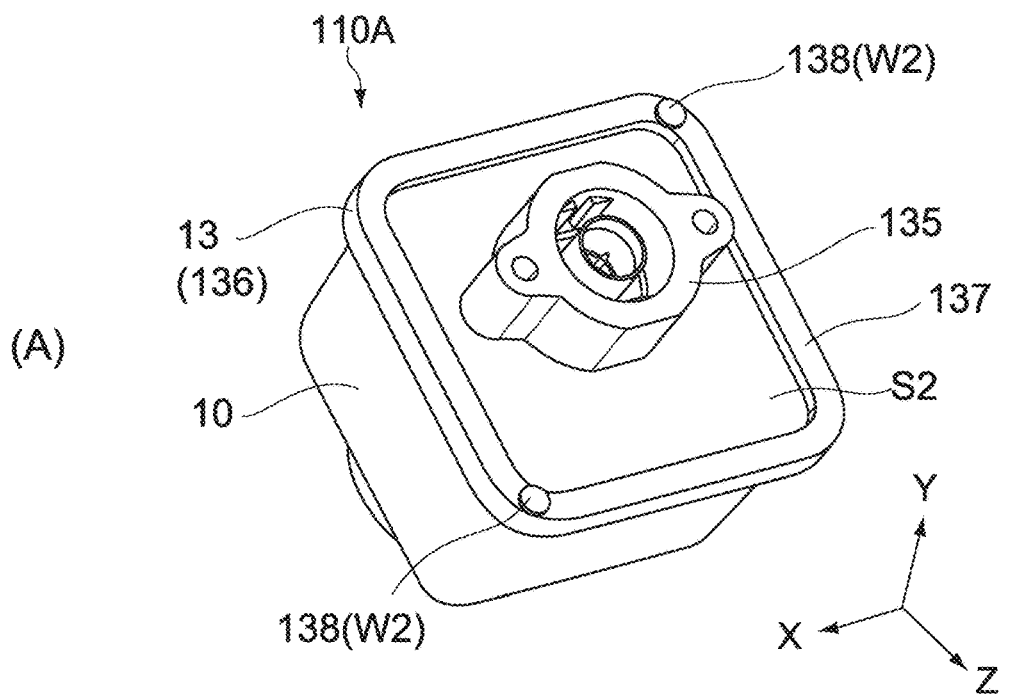
FIG. 8 is a set of perspective views illustrating other examples of a configuration of the camera unit.
Figure 8:
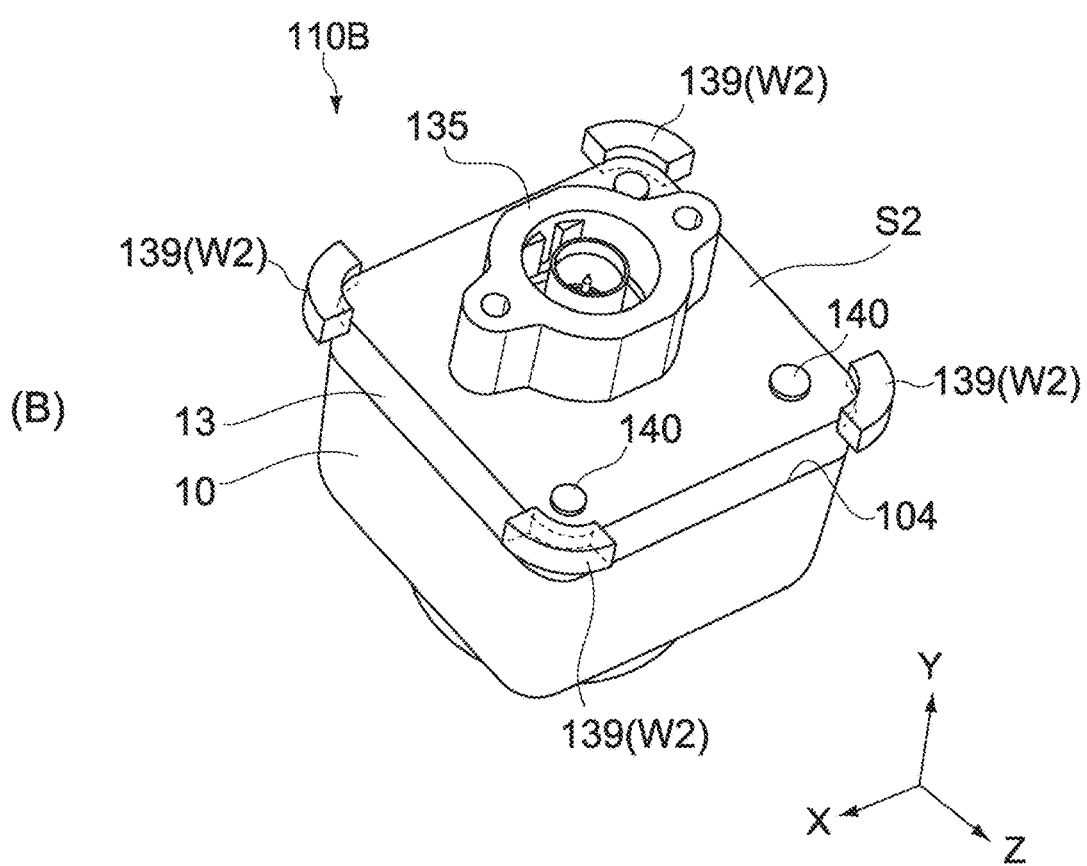

OTHER EMBODIMENTS (A) and (B) of FIG. 8 are perspective views illustrating other examples of a configuration of the camera unit 110 as viewed from the side of the rear case 13. Camera units 110A and 110B respectively illustrated in (A) and (B) of FIG. 8 each have the second welding portion W2 different from the second welding portion W2 of the embodiment described above. Note that an illustration of the bracket 120 is omitted.

In the camera unit 110A illustrated in (A) of FIG. 8, the second welding portion W2 is formed in an elevated portion 138 (the first convex surface portion) that is further formed on the protrusion 137 on the second surface S2 of the rear case 13. The elevated portion 138 is a convex surface of a specified height, the convex surface protruding toward the bracket 120 from a surface of the protrusion 137 and being welded to the bracket 120. The elevated portion 138 is provided at a plurality of positions around the second surface S (the peripheral edge 136). The elevated portion 138 is formed at positions (two positions), on the second surface S2, that are situated diagonal to each other. However, the elevated portion 138 may be formed at three or more positions situated at corners of the second surface S2. Further, the elevated portion 138 is formed on the protrusion 137 in the illustrated example. However, the protrusion 137 may be omitted. In this case, the elevated portion 138 is directly formed on the second surface S2.

In the camera unit 110A having the configuration described above, the welding portion W2 is locally formed at a position at which the elevated portion 138 is formed. Such a configuration can be applied to, for example, a camera module in which there is no need for hermetic sealing between the camera unit 110A and the bracket 120. This example makes it possible to, for example, simplify the configuration of a joining portion between the camera unit 110A and the bracket 120 and to facilitate the joining operation. Of course, even in a structure in which the welding portion W2 is locally formed at a position at which the elevated portion 138 is formed, hermetic sealing of the camera unit can be enhanced by using packing. The camera unit 110A more hermetically sealed by using packing can be used as a camera module in which there is a need for hermetic sealing.

On the other hand, in the camera unit 110B illustrated in (B) of FIG. 8, the second welding portion W2 is formed in four wing portions 139 (the first convex surface portions) formed at the four corners of the second surface S2 of the rear case 13. In this example, the rear case 13 is formed to have substantially the same size (area) as the opening end 104 of the front case 10, and a plurality of wing portions 139 is formed such that each of the plurality of wing portions 139 protrudes outward on the side of an outer periphery of the second surface S2 from a corresponding one of the four corners of the second surface S2. Each of the plurality of wing portions 139 is a convex surface of a specified height, the convex surface protruding toward the bracket 120 from the second surface S2 and being welded to the bracket 120. The second welding portion W2 is formed on a surface (an end surface) of the wing portion 139 that is situated on the side of the bracket 120.

Further, in the camera unit 110B, the rear case 13 includes a plurality of convex portions 140 (second convex surface portions). Each of the plurality of convex portions 140 is provided on the second surface S2 on the side of an inner periphery of the wing portion 139. Each of the plurality of convex portions 140 is formed to protrude toward the bracket 120 to a lesser extent than the wing portion 139. The plurality of convex portions 140 serves as a stopper that defines a relative position between the rear case 13 and the bracket when the wing portion 139 and the bracket 120 are welded to each other.

In other words, the rear case 13 is pressed against the bracket 120 under a specified load when the rear case 13 is welded to the bracket 120. Here, the wing portion 139 is melted due to irradiation of the laser light L. Thus, a distance between the L rear case 13 (the second surface S2) and the bracket 120 (the support surface 121) is gradually shortened during the irradiation of the laser light. Thus, when the convex portion 140 protruding to a lesser extent than the wing portion 139 is provided at a specified position on the second surface S2, this makes it possible to limit an approaching distance between the rear case 13 and the bracket 120 to an amount of protrusion of the convex portion 140 due to the convex portion 140 being brought into contact with the bracket 120 (the support surface 121). A position at which the convex portion 140 is formed, the number of the convex portions 140, a shape of the convex portion 140, and the like are not particularly limited, and can be set discretionarily.

Effects similar to those described above can also be provided by the camera unit 110A having the configuration above. In particular, in this example, a specified relative distance between the camera unit 110B and the bracket 120 can be stably ensured. Thus, for example, variations in optical axis can be reduced after the assembly of the sensor module.

MODIFICATIONS

In the embodiments described above, the front case 10 and the bracket 120 are made of a resin material that has absorptive properties with respect to the laser light L, and the rear case 13 is made of a resin material that has transmissive properties with respect to the laser light L. However, the front case 10, the bracket 120, and the rear case 13 are not limited thereto. For example, the front case 10 and the bracket 120 may be made of a resin material that has transmissive properties with respect to the laser light L, and the rear case 13 may be made of a resin material that has absorptive properties with respect to the laser light L.

Figure 9:
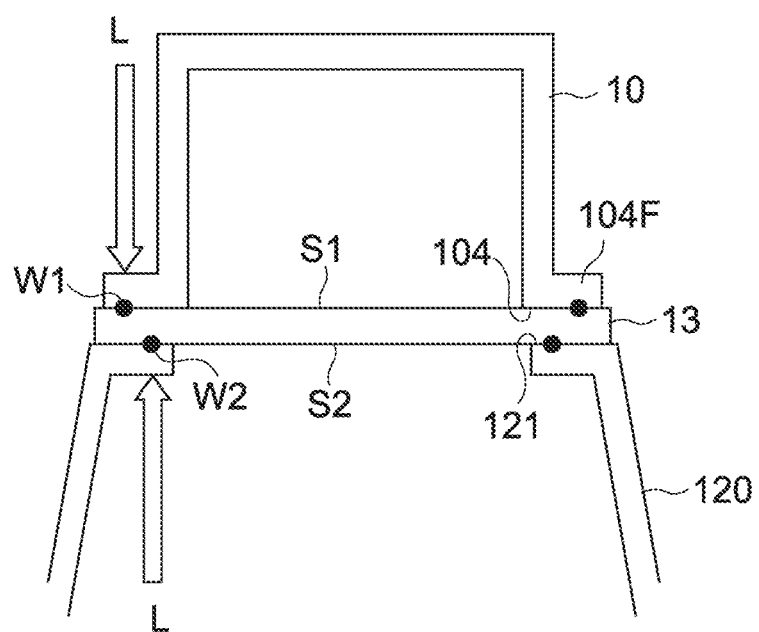
FIG. 9 schematically illustrates a modification of a configuration of the sensor module.

In this case, a flange 104F that extends outward is formed at the opening end of the front case 10, and the laser light L is irradiated onto the flange 104F to form the first welding portion W1 between the flange 104F and a portion, in the peripheral edge of the rear case 13, that corresponds to the first surface S1, for example, as schematically illustrated in FIG. 9. Further, the laser light L is irradiated onto a portion, in the bracket 120, that is situated opposite to the support surface 121 to form the second welding portion W2 between a portion, in the peripheral edge of the rear case 13, that corresponds to the second surface S2 and the support surface 121 of the bracket 120. In this example, the second welding portion W2 is formed on the side of an inner periphery of the first welding portion W1. However, the second welding portion W2 may be formed on the side of an outer periphery of the first welding portion W1.

The technology according to the present disclosure can be applied to various products. For example, the technology according to the present disclosure may be provided as a sensor module that is mounted on one of the types of mobile bodies such as vehicle, electric vehicle, hybrid electric vehicle, motorcycle, bicycle, personal mobility, airplane, drone, ship, robot, construction machinery, and agricultural machinery (tractor).

Further, a camera module has been described as an example of the sensor module 100 in the embodiments described above. However, the present technology is not limited thereto. For example, the present technology can also be adopted for a sensor module that includes, as a sensor element, a ranging sensor such as light detection and ranging (LiDAR) or a time-of-flight (ToF) sensor.

Furthermore, in the embodiments described above, the front case 10 and the rear case 13 are welded to each other by laser welding, and the rear case 13 and the bracket 120 are welded to each other by laser welding. However, the present technology can also be applied when another welding method such as ultrasonic welding is used.

The respective configurations of the sensor module, the front case, the rear case, the packing, and the like described with reference to the respective figures are merely embodiments, and any modifications may be made thereto without departing from the spirit of the present technology. In other words, any other configurations for purpose of practicing the present technology may be adopted.

Note that the present technology may also take the following configurations.

(1) A sensor module, including:
  a sensor element;
  a first casing that includes an opening end and accommodates therein the sensor element;
  a bracket that fixes the first casing to an attachment target; and
  a second casing that includes a first surface that includes a first welding portion welded to the opening end, and a second surface that includes a second welding portion welded to the bracket, the second casing being fixed between the first casing and the bracket.

(2) The sensor module according to (1), in which
  the first welding portion is annularly provided along a portion, in a peripheral edge of the second casing, that is situated on the first surface, and
  the second welding portion is annularly provided on a portion, in the peripheral edge, that is situated on the second surface on a side of an outer periphery of the first welding portion.

(3) The sensor module according to (1) or (2), in which
  the second casing further includes a first convex surface portion that protrudes toward the bracket from the second surface to form the second welding portion.

(4) The sensor module according to (3), in which
  the second casing further includes a plurality of second convex surface portions each provided on the second surface on a side of an inner periphery of the first convex surface portion, the plurality of second convex surface portions being capable of being brought into contact with the bracket.

(5) The sensor module according to (3), in which the first convex surface portion is annularly formed around the second surface.

(6) The sensor module according to (3), in which the first convex surface portion is formed at a plurality of positions around the second surface.

(7) The sensor module according to any one of (1) to (6), in which
the first casing and the bracket are made of a resin material that has absorptive properties with respect to laser light of a specified wavelength, and
the second casing is made of a resin material that has transmissive properties with respect to the laser light.

(8) The sensor module according to any one of (1) to (6), in which
the first casing and the bracket are made of a resin material that has transmissive properties with respect to laser light of a specified wavelength, and
the second casing is made of a resin material that has absorptive properties with respect to the laser light.

(9) The sensor module according to any one of (1) to (8), in which
the sensor element is a solid-state imaging device.

(10) The sensor module according to any one of (1) to (9), in which
the sensor element is a ranging sensor.

(11) A method for producing a sensor module, including:
accommodating a sensor element in a first casing;
joining a first surface of a second casing to an opening end of the first casing using laser welding; and
joining a bracket to a second surface of the second casing using the laser welding.

REFERENCE SIGNS LIST 10 front case (first casing)
22 solid-state imaging device (sensor element)
13 rear case (second casing)
104 opening end
100 sensor module
110 camera unit
120 bracket
137 protrusion (first convex surface portion)
138 elevated portion (first convex surface portion)
139 wing portion (first convex surface portion)
140 convex portion (second convex surface portion)
L laser light
S1 first surface
S2 second surface
W1 first welding portion
W2 second welding portion

The invention claimed is:

1. A sensor module, comprising:
a sensor element;
a first casing that includes an opening end and accommodates therein the sensor element;
a bracket that fixes the first casing to an attachment target;
a second casing that includes a first surface that includes a first welding portion welded to the opening end, and a second surface that includes a second welding portion welded to the bracket, the second casing being fixed between the first casing and the bracket; and
a connector provided on the second surface of the second casing, wherein the second casing further includes a first convex surface portion that protrudes toward the bracket from the second surface to form the second welding portion, and wherein the first convex surface portion is annularly formed around the second surface.

2. The sensor module according to claim 1, wherein
the first welding portion is annularly provided along a portion, in a peripheral edge of the second casing, that is situated on the first surface, and
the second welding portion is annularly provided on a portion, in the peripheral edge, that is situated on the second surface on a side of an outer periphery of the first welding portion.

3. The sensor module according to claim 1, wherein
the second casing further includes a plurality of second convex surface portions each provided on the second surface on a side of an inner periphery of the first convex surface portion, the plurality of second convex surface portions being capable of being brought into contact with the bracket.

4. A sensor module, comprising:
a sensor element;
a first casing that includes an opening end and accommodates therein the sensor element;
a bracket that fixes the first casing to an attachment target;
a second casing that includes a first surface that includes a first welding portion welded to the opening end, and a second surface that includes a second welding portion welded to the bracket, the second casing being fixed between the first casing and the bracket; and
a connector provided on the second surface of the second casing, wherein the second casing further includes a first convex surface portion that protrudes toward the bracket from the second surface to form the second welding portion, and wherein the first convex surface portion is formed at a plurality of positions around the second surface.

5. The sensor module according to claim 1, wherein
the first casing and the bracket are made of a resin material that has absorptive properties with respect to laser light of a specified wavelength, and
the second casing is made of a resin material that has transmissive properties with respect to the laser light.

6. The sensor module according to claim 1, wherein
the first casing and the bracket are made of a resin material that has transmissive properties with respect to laser light of a specified wavelength, and
the second casing is made of a resin material that has absorptive properties with respect to the laser light.

7. The sensor module according to claim 1, wherein
the sensor element is a solid-state imaging device.

8. The sensor module according to claim 1, wherein
the sensor element is a ranging sensor.

9. A method for producing a sensor module, comprising:
positioning a sensor element in a first casing;
joining a first surface of a second casing to an opening end of the first casing using laser welding;
joining a bracket to a second surface of the second casing using the laser welding; and
providing a connector on the second surface of the second casing, wherein the second casing includes a first convex surface portion that protrudes toward the bracket from the second surface to form a welding portion, and wherein the first convex surface portion is annularly formed around the second surface.

* * * * *